US010618519B2

(12) United States Patent
Marden et al.

(10) Patent No.: US 10,618,519 B2
(45) Date of Patent: Apr. 14, 2020

(54) SYSTEMS AND METHODS FOR AUTONOMOUS VEHICLE LANE CHANGE CONTROL

(71) Applicant: UATC, LLC, San Francisco, CA (US)

(72) Inventors: Samuel Philip Marden, Pittsburgh, PA (US); Eric Michael Perko, Pittsburgh, PA (US)

(73) Assignee: UATC LLC, San Francisco, CA (US)

(*) Notice: Subject to any disclaimer, the term of this patent is extended or adjusted under 35 U.S.C. 154(b) by 126 days.

(21) Appl. No.: 15/862,757

(22) Filed: Jan. 5, 2018

(65) Prior Publication Data

US 2019/0135290 A1    May 9, 2019

Related U.S. Application Data

(60) Provisional application No. 62/582,005, filed on Nov. 6, 2017.

(51) Int. Cl.
| | | |
|---|---|---|
| *B60W 30/00* | (2006.01) | |
| *B60W 30/12* | (2020.01) | |
| *G06K 9/00* | (2006.01) | |
| *G08G 1/00* | (2006.01) | |
| *B60W 30/18* | (2012.01) | |

(52) U.S. Cl.
CPC ...... *B60W 30/18163* (2013.01); *B60W 30/12* (2013.01); *G06K 9/00798* (2013.01); *G06K 9/00805* (2013.01)

(58) Field of Classification Search
CPC ...... B60W 30/00; B60W 30/10; B60W 30/12; B60W 30/16; B60W 30/18163; G06K 9/00; G06K 9/00798; G06K 9/00805; G01C 21/00; G01C 21/24; G01C 21/26; G01C 21/34; G01S 19/00; G01S 19/42; G08G 1/00; G08G 1/166; G08G 1/167
See application file for complete search history.

(56) References Cited

U.S. PATENT DOCUMENTS

| | | | | |
|---|---|---|---|---|
| 9,676,389 | B2* | 6/2017 | Clarke | G01C 21/30 |
| 9,910,440 | B2* | 3/2018 | Wei | G05D 1/0088 |
| 2011/0190972 | A1* | 8/2011 | Timmons | G01C 21/34 |
| | | | | 701/31.4 |
| 2016/0052514 | A1* | 2/2016 | Clarke | B60W 30/00 |
| | | | | 701/28 |
| 2016/0347322 | A1* | 12/2016 | Clarke | B60W 30/00 |

* cited by examiner

*Primary Examiner* — Yonel Beaulieu
(74) *Attorney, Agent, or Firm* — Dority & Manning, P.A.

(57) ABSTRACT

Systems and methods are directed to lane change control for an autonomous vehicle. In one example, a computer-implemented method for determining whether to abort a lane change in an autonomous vehicle includes initiating, by a computing system comprising one or more computing devices, a lane change procedure for an autonomous vehicle. The method further includes obtaining, by the computing system, data indicative of one or more changed objects relative to the autonomous vehicle. The method further includes determining, by the computing system, that the lane change procedure cannot be completed by the autonomous vehicle based at least in part on the data indicative of one or more changed objects. The method further includes in response to determining that the lane change cannot be completed by the autonomous vehicle, generating, by the computing system, a motion plan that controls the autonomous vehicle to abort the lane change procedure.

20 Claims, 5 Drawing Sheets

SYSTEMS AND METHODS FOR AUTONOMOUS VEHICLE LANE CHANGE CONTROL

This application claims the benefit of U.S. Provisional Application No. 62/582,005, filed Nov. 6, 2017, which is incorporated herein by reference.

FIELD

The present disclosure relates generally to operation of autonomous vehicles, and more particularly to lane change control for autonomous vehicles.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. This can allow an autonomous vehicle to navigate without human intervention and, in some cases, even omit the use of a human driver altogether.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for determining whether to abort a lane change in an autonomous vehicle. The method includes initiating, by a computing system comprising one or more computing devices, a lane change procedure for an autonomous vehicle. The method further includes obtaining, by the computing system, data indicative of one or more changed objects relative to the autonomous vehicle. The method further includes determining, by the computing system, that the lane change procedure cannot be completed by the autonomous vehicle based at least in part on the data indicative of one or more changed objects. The method further includes in response to determining that the lane change cannot be completed by the autonomous vehicle, generating, by the computing system, a motion plan that controls the autonomous vehicle to abort the lane change procedure.

Another example aspect of the present disclosure is directed to a computing system. The computing system includes one or more processors; and one or more memories including instructions that, when executed by the one or more processors, cause the one or more processors to perform operations. The operations include initiating a lane change procedure for the autonomous vehicle in keeping with one or more thresholds being satisfied. The operations further include obtaining data indicative of one or more changed objects relative to the autonomous vehicle. The operations further include determining that the lane change procedure cannot be completed by the autonomous vehicle based at least in part on the data indicative of one or more changed objects and that the one or more thresholds cannot still be satisfied. The operations further include in response to determining that the lane change cannot be completed by the autonomous vehicle, generating a motion plan that controls the autonomous vehicle to abort the lane change procedure.

Another example aspect of the present disclosure is directed to an autonomous vehicle. The autonomous vehicle includes a vehicle computing system. The vehicle computing system includes one or more processors and one or more memories including instructions that, when executed by the one or more processors, cause the one or more processors to perform operations. The operations include initiating a lane change procedure for the autonomous vehicle. The operations further include obtaining data indicative of one or more changed objects relative to the autonomous vehicle. The operations further include determining that the lane change procedure cannot be completed by the autonomous vehicle based at least in part on the data indicative of one or more changed objects. The operations further include in response to determining that the lane change cannot be completed by the autonomous vehicle, generating a motion plan that controls the autonomous vehicle to abort the lane change procedure.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodi- Example aspects of the present disclosure are directed to lane change control for an autonomous vehicle, e.g., determining whether an initiated lane change should be aborted by an autonomous vehicle. In particular, the systems and methods of the present disclosure can determine if one or more objects in the surrounding environment have altered from a predicted behavior such that an initiated lane change can no longer be completed safely and comfortably. The systems and methods of the present disclosure can provide for aborting the initiated lane change by either remaining within the current lane boundaries and/or completely returning to the original lane (e.g., if the autonomous vehicle has begun to cross the lane boundary into the adjacent lane), depending on the phase of the initiated lane change. By providing features for aborting a lane change, potential opportunities for initiating lane changes during autonomous vehicle navigation can increase while enhancing navigational effectiveness and vehicle safety during lane changes.

In particular, an autonomous vehicle may be traveling in a particular lane and a vehicle computing system in the autonomous vehicle may determine that the autonomous vehicle should move to an adjacent lane and subsequently initiate a lane change procedure. According to example aspects of the present disclosure, a vehicle computing system can determine that an object in the surrounding environment (e.g., a leading vehicle in the target lane, a trailing vehicle in the target lane, and/or the like) has changed behavior relative to the autonomous vehicle from that which was previously predicted such that it may no longer be feasible or safe to complete the initiated lane change into the target lane. For instance, data indicative of one or more changed objects relative to an autonomous vehicle can indicate that a trailing vehicle has accelerated and reduced the available space in the target lane, that a leading vehicle has slowed down and reduced the available space in the target lane, etc. Accordingly, in response to determining that an initiated lane change is no longer feasible, the vehicle computing system can abort the initiated lane change. When the autonomous vehicle has not begun moving to the target lane, the autonomous vehicle can abort the initiated lane change by remaining in the current lane. When the autonomous vehicle has already begun crossing into the target lane, the autonomous vehicle can abort the lane change by completely returning to the original lane.

More particularly, an autonomous vehicle (e.g., a ground-based vehicle, air-based vehicle, and/or other vehicle type) can include a variety of systems onboard the autonomous vehicle to control the operation of the vehicle. For instance, the autonomous vehicle can include one or more data acquisition systems (e.g., sensors, image capture devices), one or more vehicle computing systems (e.g. for providing autonomous operation), one or more vehicle control systems, (e.g., for controlling acceleration, braking, steering, etc.), and/or the like. The data acquisition system(s) can acquire sensor data (e.g., lidar data, radar data, image data, etc.) associated with one or more objects (e.g., pedestrians, vehicles, etc.) that are proximate to the autonomous vehicle and/or sensor data associated with the vehicle path (e.g., path shape, boundaries, markings, etc.). The sensor data can include information that describes the location (e.g., in three-dimensional space relative to the autonomous vehicle) of points that correspond to objects within the surrounding environment of the autonomous vehicle (e.g., at one or more times). The data acquisition system(s) can provide such sensor data to the vehicle computing system.

In addition to the sensor data, the vehicle computing system can obtain map data that provides other detailed information about the surrounding environment of the autonomous vehicle. For example, the map data can provide information regarding: the identity and location of various roadways, road segments, buildings, or other items; the location and direction of traffic lanes (e.g. the boundaries, location, direction, etc. of a travel lane, parking lane, a turning lane, a bicycle lane, and/or other lanes within a particular travel way); traffic control data (e.g., the location and instructions of signage, traffic signals, and/or other traffic control devices); and/or any other map data that provides information that can assist the autonomous vehicle in comprehending and perceiving its surrounding environment and its relationship thereto.

The vehicle computing system can include one or more computing devices and include various subsystems that can cooperate to perceive the surrounding environment of the autonomous vehicle and determine a motion plan for controlling the motion of the autonomous vehicle. For instance, the vehicle computing system can include a perception system, a predication system, and a motion planning system. The vehicle computing system can receive and process the sensor data to generate an appropriate motion plan through the vehicle's surrounding environment.

The perception system can detect one or more objects that are proximate to the autonomous vehicle based on the sensor data. In particular, in some implementations, the perception system can determine, for each object, state data that describes a current state of such object. As examples, the state data for each object can describe an estimate of the object's: current location (also referred to as position); current speed/velocity; current acceleration; current heading; current orientation; size/footprint; class (e.g., vehicle class versus pedestrian class versus bicycle class, etc.); and/or other state information. In some implementations, the perception system can determine state data for each object over a number of iterations. In particular, the perception system can update the state data for each object at each iteration. Thus, the perception system can detect and track objects (e.g., vehicles, bicycles, pedestrians, etc.) that are proximate to the autonomous vehicle over time, and thereby produce a presentation of the world around an autonomous vehicle along with its state (e.g., a presentation of the objects within a scene at the current time along with the states of the objects).

The prediction system can receive the state data from the perception system and predict one or more future locations for each object based on such state data. For example, the prediction system can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system can determine a motion plan for the autonomous vehicle based at least in part on predicted one or more future locations for the object provided by the prediction system and/or the state data for the object provided by the perception system. Stated differently, given information about the classification and current locations of objects and/or predicted future locations of proximate objects, the motion planning system can determine a motion plan for the autonomous vehicle that best navigates the autonomous vehicle along the determined travel route relative to the objects at such locations.

As one example, in some implementations, the motion planning system can determine a cost function for each of one or more candidate motion plans for the autonomous vehicle based at least in part on the current locations and/or predicted future locations of the objects. For example, the cost function can describe a cost (e.g., over time) of adhering to a particular candidate motion plan. For example, the cost described by a cost function can increase when the autonomous vehicle approaches impact with another object and/or deviates from a preferred pathway (e.g., a predetermined travel route).

Thus, given information about the classifications, current locations, and/or predicted future locations of objects, the motion planning system can determine a cost of adhering to a particular candidate pathway. The motion planning system can select or determine a motion plan for the autonomous vehicle based at least in part on the cost function(s). For example, the motion plan that minimizes the cost function can be selected or otherwise determined. The motion planning system then can provide the selected motion plan to a vehicle controller that controls one or more vehicle controls (e.g., actuators or other devices that control acceleration, steering, braking, etc.) to execute the selected motion plan.

In particular, in some implementations, after initiating a lane change, the vehicle computing system (e.g., the perception system and/or prediction system) can determine that one or more objects in the target lane have deviated from the behavior that was previously predicted for the object such that the vehicle computing system should determine whether the lane change remains feasible and can be completed.

For example, in some implementations, the vehicle computing system can use sensor data to observe all the objects around the autonomous vehicle including vehicles in the target lane that the autonomous vehicle is attempting to move into. The vehicle computing system can determine predictions/estimations of where the objects will be in the next 5 seconds, 10 seconds, or the like, and determine if the object predictions have changed significantly since the lane change was initiated. The vehicle computing system can then determine whether the lane change into the target lane can be completed or if the lane change should be aborted due to the changed circumstances since the lane change was initiated.

As an example, after initiating a lane change into a target lane, the vehicle computing system may determine that a leading vehicle (e.g., a vehicle ahead of the autonomous vehicle) in the target lane has decelerated suddenly (e.g., braked aggressively) such that the vehicle computing system should analyze one or more features of the leading vehicle relative to the autonomous vehicle (e.g., relative spacing, deceleration required to maintain distance from the vehicle, etc.) to determine if the lane change should be aborted based on the change in the vehicle's previously predicted behavior.

As another example, after initiating a lane change into a target lane, the vehicle computing system may determine that a trailing vehicle (e.g., a vehicle behind the autonomous vehicle) in the target lane has accelerated suddenly and/or a new vehicle has aggressively moved into the target lane behind the autonomous vehicle such that the vehicle computing system should analyze one or more features of the vehicle relative to the autonomous vehicle (e.g., relative spacing, acceleration required to maintain distance from the vehicle, etc.) to determine if the lane change should be aborted based on the change in the vehicle's previously predicted behavior.

As another example, after initiating a lane change into a target lane, the vehicle computing system may determine that a vehicle from a lane adjacent to the target lane has moved into the target lane such that the vehicle computing system should analyze one or more features of the vehicle relative to the autonomous vehicle (e.g., relative spacing, acceleration required to maintain distance from the vehicle, etc.) to determine if the lane change should be aborted based on the change in the vehicle's behavior.

In some implementations, the vehicle computing system may consider other sensor data or other inputs in addition to object perception and/or predictions/estimations from the prediction object outputs when determining whether a lane change should be aborted. For example, other sensors or data input may provide information regarding the free space around an autonomous vehicle that may be considered in the determination of whether a lane change can be safely completed or should be aborted.

According to another aspect of the disclosure, in some implementations, after determining that a lane change should be aborted, the vehicle computing system can further determine the feasibility of aborting the lane change and returning to the original lane before initiating the lane change abort. For example, the vehicle computing system can determine features of one or more vehicles (or other objects) in the original lane relative to the autonomous vehicle to determine whether the autonomous vehicle can safely and comfortably return to the original lane (for example, where leading vehicles in both the target lane and the original lane brake suddenly, etc.). In some implementations, the vehicle computing system can determine whether it would be more feasible to complete or abort the lane change in such situations and respond accordingly.

In some implementations, the performance of a lane change for an autonomous vehicle may occur in a number of phases and the autonomous vehicle may provide for aborting a lane change differently based on the current phase of the lane change. For example, the performance of an autonomous vehicle lane change according to example embodiments may be viewed as being divided into three phases. The first (initiation) phase of a lane change may begin once the autonomous vehicle determines that a safe lane change can be executed and the autonomous vehicle may signal the intention to change lanes. During the first phase, the autonomous vehicle may remain positioned within the current/original lane. If the vehicle computing system determines that the lane change should be aborted during the first phase, the autonomous vehicle can abort the lane change by remaining within the boundaries of the current/original lane. During the second (movement) phase of the lane change, the autonomous vehicle moves out of the original lane and at least partially crosses the lane boundary beginning to move into the adjacent/target lane. If the vehicle computing system determines that the lane change should be aborted during the second phase, the autonomous vehicle can abort the lane change by completely returning to the original lane. During the third phase of the lane change, the autonomous vehicle has completely moved into the target lane and proceeds within the boundaries of the target lane.

According to another aspect of the disclosure, in some implementations, the vehicle computing system may consider a number of defined rules or heuristics when determining whether to abort a lane change once it has been initiated. For example, in some implementations, the vehicle computing system may determine that a lane change should be aborted if one or more previously satisfied thresholds can no longer be satisfied due to one or more changed objects proximate to an autonomous vehicle. For example, in some implementations, the vehicle computing system may determine that a lane change should be aborted if a threshold distance between the autonomous vehicle after completing the lane change and a leading vehicle in the target lane cannot be satisfied (e.g., due to the leading vehicle braking or slowing down, a new vehicle moving into the target lane, etc.). In some implementations, the vehicle computing system may determine that a lane change should be aborted if a threshold distance between the autonomous vehicle after completing the lane change and a trailing vehicle in the target lane cannot be satisfied (e.g., due to the trailing vehicle accelerating, a new vehicle moving into the target lane, etc.). In some implementations, the vehicle computing system may determine that a lane change should be aborted if a deceleration threshold for the autonomous vehicle would be exceeded in order to complete the lane change into the target lane (e.g., the autonomous vehicle would have to brake aggressively to maintain distance from a leading vehicle). In some implementations, the vehicle computing system may determine that a lane change should be aborted if an acceleration threshold for the autonomous vehicle would be exceeded in order to complete the lane change into the target lane (e.g., the autonomous vehicle would have to accelerate aggressively to maintain distance from a trailing vehicle). In some implementations, the vehicle computing system may determine that a lane change can be aborted only if the autonomous vehicle has occupied less than a threshold amount of the target lane (e.g., if in making the lane change the autonomous vehicle has moved into the target lane such that it occupies less than a threshold amount and/or is not significantly occupying the target lane).

According to another aspect of the disclosure, in some implementations, the determination of whether to abort a lane change can involve the use of one or more machine-learned models. For example, rather than a rules-based analysis, the vehicle computing system may provide the input data (e.g., one or more features or states of objects relative to the autonomous vehicle and/or the like) to a machine-learned model which may output a prediction of whether a lane change should be aborted due to changed conditions and/or the like. In some implementations, the machine-learned model can consider how the autonomous vehicle would occupy the target lane space with respect to other vehicles in the determination of whether to abort a lane change. In some implementations, a machine-learned model output can provide a ranking of one or more options for aborting or completing an initiated lane change. For example, the machine-learned model can rank the options for aborting or completing the lane change if aborting the lane change by remaining in or returning to the original lane is also not ideal.

In some implementations, the vehicle computing system may provide for one or more notifications regarding the lane change and/or the lane change abort to be provided to one or more occupants of the autonomous vehicle (e.g., a driver, passenger, etc.). For example, in some implementations, the autonomous vehicle (e.g., the vehicle computing system) may provide for displaying a visual indicator (e.g., via a display panel, tablet, and/or the like) that a lane change is being initiated and may subsequently provide for displaying a visual indicator if it is determined that the lane change is being aborted. In some implementations, the autonomous vehicle (e.g., the vehicle computing system) may provide for an audio indication of the lane change initiation and/or the lane change abort.

The systems and methods described herein provide a number of technical effects and benefits. For instance, the vehicle computing system can locally (e.g., on board the autonomous vehicle) detect changes in object position and/or behavior, evaluate in-progress lane changes, and adjust the route of the autonomous vehicle accordingly. By performing such operations onboard the autonomous vehicle, the vehicle computing system can avoid latency issues that arise from communicating with a remote computing system. The vehicle computing system can be configured to perform this process as the autonomous vehicle travels a planned route to optimize vehicle efficiency and travel time. Further, by providing for the evaluation of in-progress lane changes and the possibility for aborting lane changes, an autonomous vehicle can implement lane changes in an improved fashion by not requiring overly conservative determinations to initiate a lane change. As such, the vehicle computing system can proactively adjust the route of the autonomous vehicle to increase travel efficiency and achieve improved driving safety.

The systems and methods described herein can also provide resulting improvements to vehicle computing technology tasked with operation of an autonomous vehicle. For example, aspects of the present disclosure can enable a vehicle computing system to more efficiently and accurately control an autonomous vehicle's route by providing for aborting in-progress lane changes rather than implementing abrupt changes to complete a compromised lane change and thus, providing for smoother travel lane changes based on the ongoing analysis of objects in the surrounding environment.

With reference to the figures, example embodiments of the present disclosure will be discussed in further detail.

Figure 1:
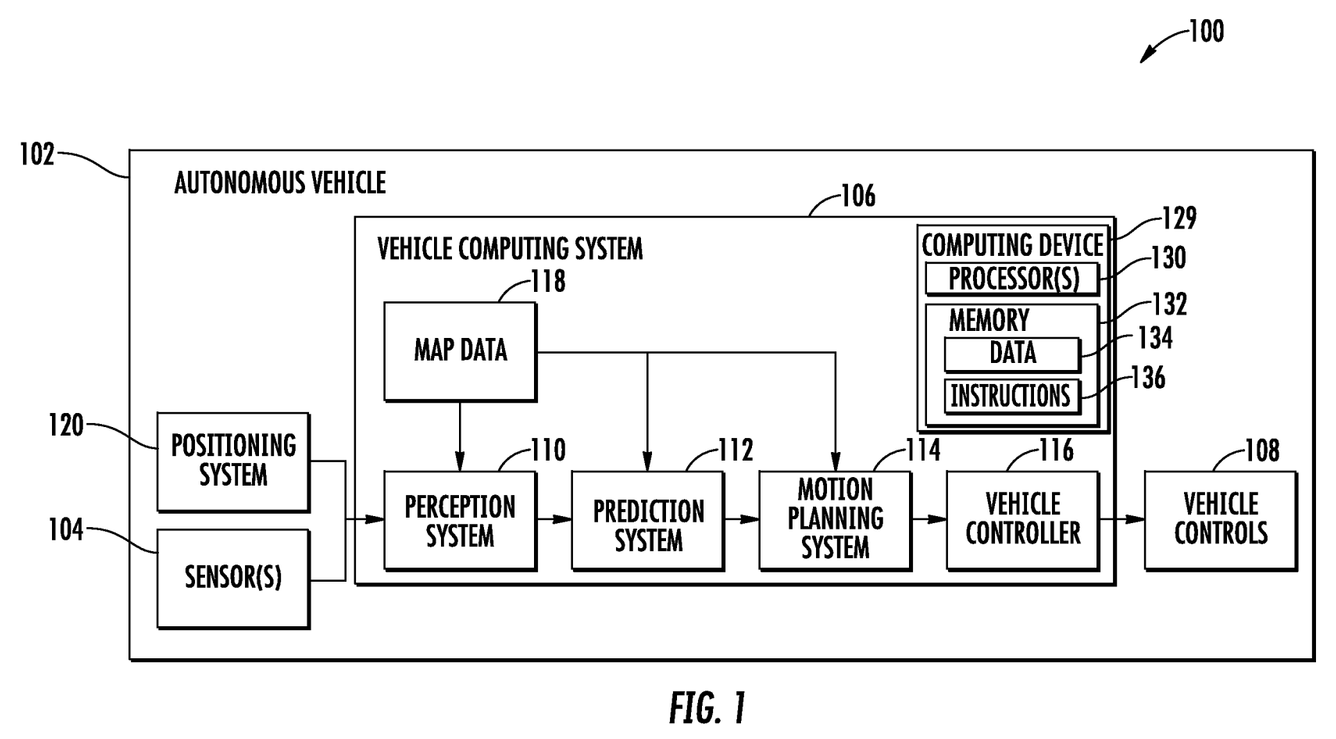
FIG. 1 depicts a block diagram of an example system for controlling the navigation of an autonomous vehicle according to example embodiments of the present disclosure.

FIG. 1 depicts a block diagram of an example system 100 for controlling the navigation of an autonomous vehicle 102 according to example embodiments of the present disclosure. The autonomous vehicle 102 is capable of sensing its environment and navigating with little to no human input. The autonomous vehicle 102 can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle 102 can be configured to operate in one or more modes, for example, a fully autonomous operational mode and/or a semi-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle.

The autonomous vehicle 102 can include one or more sensors 104, a vehicle computing system 106, and one or more vehicle controls 108. The vehicle computing system 106 can assist in controlling the autonomous vehicle 102. In particular, the vehicle computing system 106 can receive sensor data from the one or more sensors 104, attempt to comprehend the surrounding environment by performing various processing techniques on data collected by the sensors 104, and generate an appropriate motion path through such surrounding environment. The vehicle computing system 106 can control the one or more vehicle controls 108 to operate the autonomous vehicle 102 according to the motion path.

The vehicle computing system 106 can include one or more processors 130 and at least one memory 132. The one or more processors 130 can be any suitable processing device (e.g., a processor core, a microprocessor, an ASIC, a FPGA, a controller, a microcontroller, etc.) and can be one processor or a plurality of processors that are operatively connected. The memory 132 can include one or more non-transitory computer-readable storage mediums, such as RAM, ROM, EEPROM, EPROM, flash memory devices, magnetic disks, etc., and combinations thereof. The memory 132 can store data 134 and instructions 136 which are executed by the processor 130 to cause vehicle computing system 106 to perform operations. In some implementations, the one or more processors 130 and at least one memory 132 may be comprised in one or more computing devices, such as computing device(s) 129, within the vehicle computing system 106.

In some implementations, vehicle computing system 106 can further include a positioning system 120. The positioning system 120 can determine a current position of the autonomous vehicle 102. The positioning system 120 can be any device or circuitry for analyzing the position of the autonomous vehicle 102. For example, the positioning system 120 can determine position by using one or more of inertial sensors, a satellite positioning system, based on IP address, by using triangulation and/or proximity to network access points or other network components (e.g., cellular towers, WiFi access points, etc.) and/or other suitable techniques for determining position. The position of the autonomous vehicle 102 can be used by various systems of the vehicle computing system 106.

As illustrated in FIG. 1, in some embodiments, the vehicle computing system 106 can include a perception system 110, a prediction system 112, and a motion planning system 114 that cooperate to perceive the surrounding environment of the autonomous vehicle 102 and determine a motion plan for controlling the motion of the autonomous vehicle 102 accordingly.

In particular, in some implementations, the perception system 110 can receive sensor data from the one or more sensors 104 that are coupled to or otherwise included within the autonomous vehicle 102. As examples, the one or more sensors 104 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 102.

As one example, for LIDAR system, the sensor data can include the location (e.g., in three-dimensional space relative to the LIDAR system) of a number of points that correspond to objects that have reflected a ranging laser. For example, LIDAR system can measure distances by measuring the Time of Flight (TOF) that it takes a short laser pulse to travel from the sensor to an object and back, calculating the distance from the known speed of light.

As another example, for RADAR system, the sensor data can include the location (e.g., in three-dimensional space relative to RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well. Thus, the one or more sensors 104 can be used to collect sensor data that includes information that describes the location (e.g., in three-dimensional space relative to the autonomous vehicle 102) of points that correspond to objects within the surrounding environment of the autonomous vehicle 102.

In addition to the sensor data, the perception system 110 can retrieve or otherwise obtain map data 118 that provides detailed information about the surrounding environment of the autonomous vehicle 102. The map data 118 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 106 in comprehending and perceiving its surrounding environment and its relationship thereto.

The perception system 110 can identify one or more objects that are proximate to the autonomous vehicle 102 based on sensor data received from the one or more sensors 104 and/or the map data 118. In particular, in some implementations, the perception system 110 can determine, for each object, state data that describes a current state of such object. As examples, the state data for each object can describe an estimate of the object's: current location (also referred to as position); current speed; current heading (also referred to together as velocity); current acceleration; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 110 can determine state data for each object over a number of iterations. In particular, the perception system 110 can update the state data for each object at each iteration. Thus, the perception system 110 can detect and track objects (e.g., vehicles, pedestrians, bicycles, and the like) that are proximate to the autonomous vehicle 102 over time.

The prediction system 112 can receive the state data from the perception system 110 and predict one or more future locations for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 114 can determine a motion plan for the autonomous vehicle 102 based at least in part on the predicted one or more future locations for the object provided by the prediction system 112 and/or the state data for the object provided by the perception system 110. Stated differently, given information about the current locations of objects and/or predicted future locations of proximate objects, the motion planning system 114 can determine a motion plan for the autonomous vehicle 102 that best navigates the autonomous vehicle 102 relative to the objects at such locations.

As one example, in some implementations, the motion planning system 114 can determine a cost function for each of one or more candidate motion plans for the autonomous vehicle 102 based at least in part on the current locations and/or predicted future locations of the objects. For example, the cost function can describe a cost (e.g., over time) of adhering to a particular candidate motion plan. For example, the cost described by a cost function can increase when the autonomous vehicle 102 approaches a possible impact with another object and/or deviates from a preferred pathway (e.g., a preapproved pathway).

Thus, given information about the current locations and/or predicted future locations of objects, the motion planning system 114 can determine a cost of adhering to a particular candidate pathway. The motion planning system 114 can select or determine a motion plan for the autonomous vehicle 102 based at least in part on the cost function(s). For example, the candidate motion plan that minimizes the cost function can be selected or otherwise determined. The motion planning system 114 can provide the selected motion plan to a vehicle controller 116. The vehicle controller 116 can generate one or more commands, based at least in part on the motion plan, which can be provided to one or more vehicle interfaces. The one or more commands from the vehicle controller 116 can provide for operating one or more vehicle controls 108 (e.g., actuators or other devices that control acceleration, throttle, steering, braking, etc.) to execute the selected motion plan.

Each of the perception system 110, the prediction system 112, the motion planning system 114, and the vehicle controller 116 can include computer logic utilized to provide desired functionality. In some implementations, each of the perception system 110, the prediction system 112, the motion planning system 114, and the vehicle controller 116 can be implemented in hardware, firmware, and/or software controlling a general purpose processor. For example, in some implementations, each of the perception system 110, the prediction system 112, the motion planning system 114, and the vehicle controller 116 includes program files stored on a storage device, loaded into a memory, and executed by one or more processors. In other implementations, each of the perception system 110, the prediction system 112, the motion planning system 114, and the vehicle controller 116 includes one or more sets of computer-executable instructions that are stored in a tangible computer-readable storage medium such as RAM hard disk or optical or magnetic media.

Figure 2:
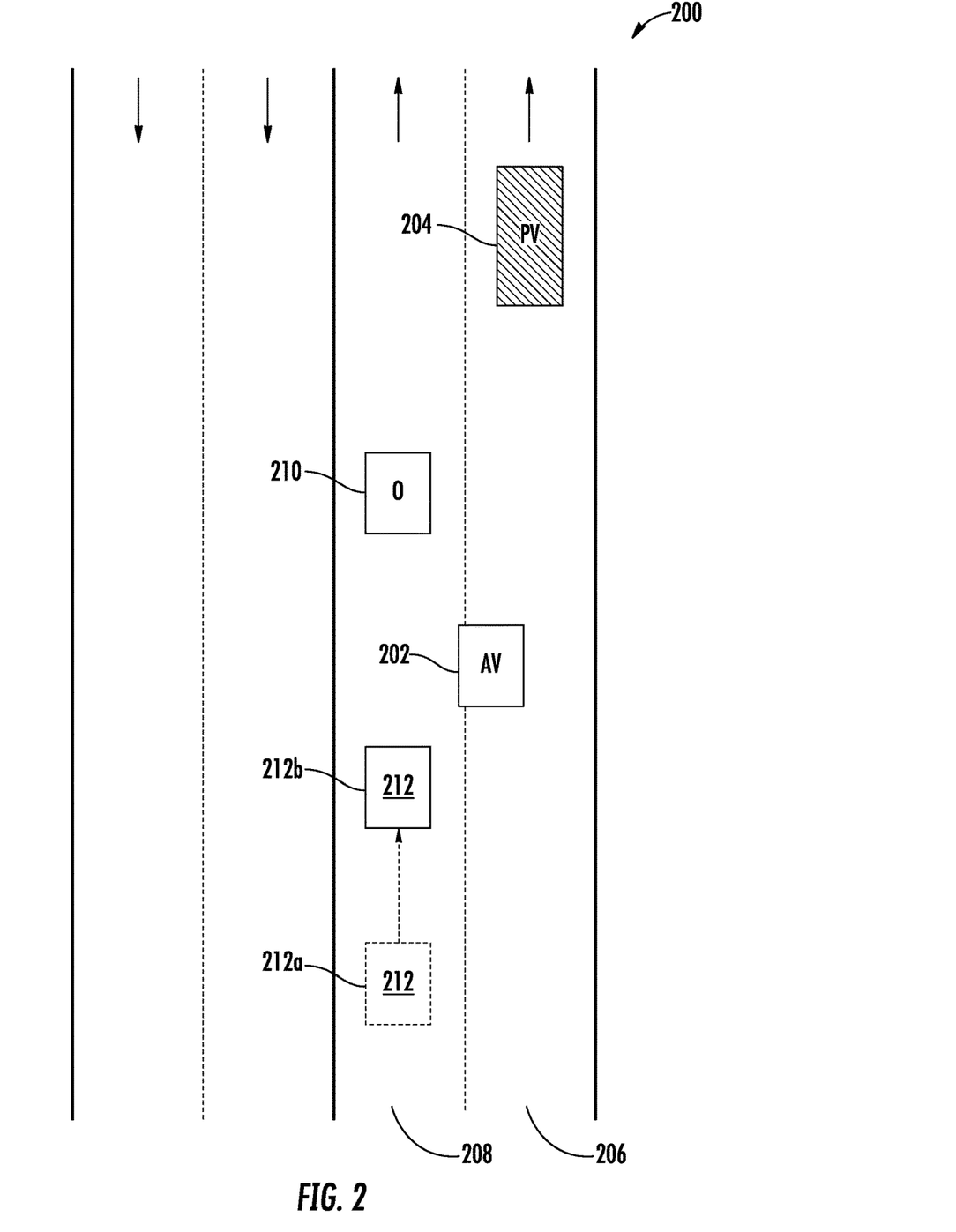
FIG. 2 depicts a block diagram of an example lane change abort scenario according to example embodiments of the present disclosure.

FIG. 2 depicts a block diagram of an example lane change abort scenario 200 according to example embodiments of the present disclosure. As illustrated in FIG. 2, an autonomous vehicle 202 may be traveling in an original lane 206 and may determine that a vehicle 204 ahead of the autonomous vehicle in the original lane 206 is not expected to flow with traffic. For example, the vehicle 204 may be stopped in the original lane 206 but is not at a red traffic light or stop sign (e.g., may be temporarily stopped at an arbitrary point in the travel lane). As another example, the vehicle 204 may be moving slowly in the original lane 206 with no traffic ahead of the vehicle 204. The autonomous vehicle 202 (e.g., the vehicle computing system) may further determine there is not enough room to get around the vehicle 204 without leaving the boundaries of original lane 206, and thus the autonomous vehicle 202 is likely to be queued behind the vehicle 204 if it remains in the original lane 206.

Accordingly, the autonomous vehicle 202 (e.g., the vehicle computing system) can analyze adjacent lane(s) 208 to determine if there is a safe and viable lane change that will allow the autonomous vehicle 202 to move around the vehicle 204. For example, the autonomous vehicle 202 can determine, at a current moment in time, that there is enough room in front of and behind the autonomous vehicle 202 in relation to one or more other vehicles, such as vehicle 210 and vehicle 212, in an adjacent lane 208 for the autonomous vehicle 202 to move into the adjacent lane 208 safely and comfortably and may initiate a lane change procedure to move from the original lane 206 to the adjacent lane 208.

Upon initiating a lane change procedure, the autonomous vehicle 202 (e.g., the vehicle computing system) can continue to analyze the surrounding environment and determine if one or more objects in the surrounding environment (e.g., a leading vehicle in the target lane, a trailing vehicle in the target lane, and/or the like) has changed behavior relative to the autonomous vehicle 202 from that which was previously predicted such that it may no longer be feasible or safe to complete the initiated lane change into the target lane (e.g., adjacent lane 208).

For example, as illustrated in FIG. 2, data indicative of one or more changed objects relative to an autonomous vehicle can indicate that a trailing vehicle, such as a trailing vehicle 212 at first vehicle position 212*a*, has accelerated and reduced the available space in the target lane 208, for example by accelerating and reducing the available space as illustrated by second vehicle position 212*b*. Accordingly, in response to determining that an initiated lane change is no longer feasible, the vehicle computing system can abort the initiated lane change. If the autonomous vehicle 202 has not begun moving to the target lane (e.g., adjacent lane 208), the autonomous vehicle 202 can abort the initiated lane change by remaining in the first lane 206. If the autonomous vehicle 202 has already begun crossing into the target lane 208 (e.g., adjacent lane 208), the autonomous vehicle 202 can abort the lane change by completely returning to the original lane 206.

Figure 3:
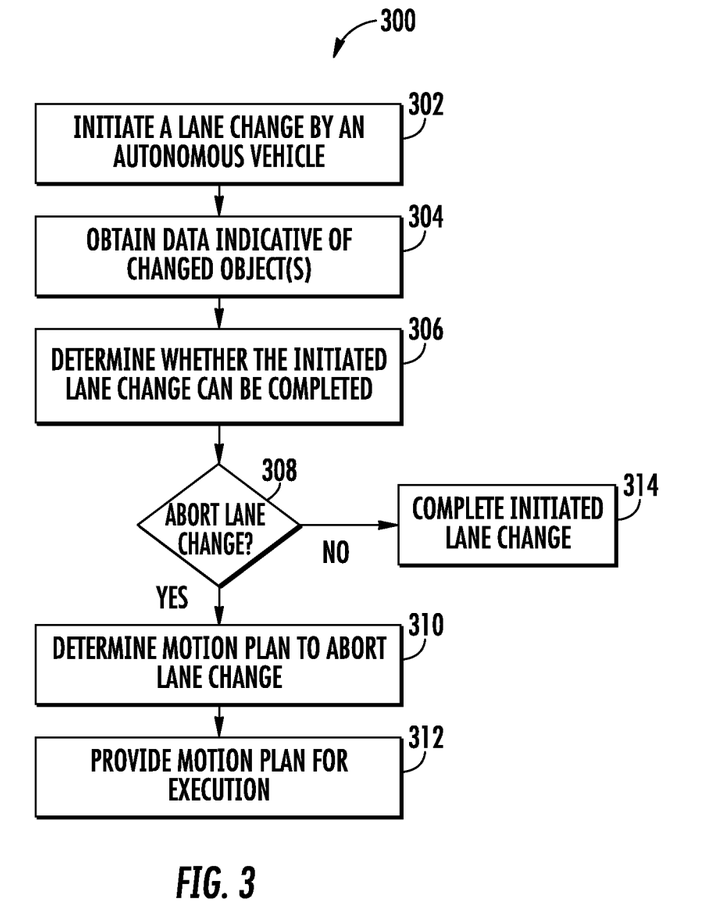
FIG. 3 depicts a flowchart diagram of example operations for aborting a lane change according to example embodiments of the present disclosure.

FIG. 3 depicts a flowchart diagram of example operations 300 for lane change control for an autonomous vehicle according to example embodiments of the present disclosure. One or more portion(s) of the operations 300 can be implemented by one or more computing devices such as, for example, the vehicle computing system 106 of FIG. 1, the computing system 502 or 106 of FIG. 5, and/or the like. Moreover, one or more portion(s) of the operations 300 can be implemented as an algorithm on the hardware components of the device(s) described herein (e.g., as in FIGS. 1 and 5) to, for example, provide for lane change control for an autonomous vehicle (e.g., determining whether an initiated lane change should be aborted).

At 302, one or more computing devices included within a computing system (e.g., computing system 106, 502, and/or the like) can initiate a lane change by the autonomous vehicle into an adjacent lane. For example, an autonomous vehicle may be traveling in a particular lane and a vehicle computing system in the autonomous vehicle may determine that the autonomous vehicle should move to an adjacent lane and subsequently initiate a lane change procedure.

At 304, the computing system can obtain data indicative of one or more changed objects in the surrounding environment. For example, a vehicle computing system can determine that an object in the surrounding environment (e.g., a leading vehicle in the target lane, a trailing vehicle in the target lane, and/or the like) has changed behavior (e.g., a changed state as determined be a perception system 110 and/or changed predicted future location(s) as determined by a prediction system 112) relative to the autonomous vehicle from that which was previously predicted such that it may no longer be feasible or safe to complete the initiated lane change into the target lane. For instance, data indicative of one or more changed objects relative to an autonomous vehicle can indicate that a trailing vehicle has accelerated and reduced the available space in the target lane, that a leading vehicle has slowed down and reduced the available space in the target lane, etc.

At 306, the computing system can determine whether the initiated lane change can be completed safely. For example, in some implementations, the vehicle computing system (e.g., the perception system and/or prediction system) can determine that one or more objects in the target lane have deviated from the behavior that was previously predicted for the object such that the vehicle computing system should determine whether the lane change remains feasible and can be completed. In some implementations, the vehicle computing system can use the obtained data to observe all the objects around the autonomous vehicle including vehicles in the target lane that the autonomous vehicle is attempting to move into. The vehicle computing system can determine predictions/estimations of where the objects will be in the next 5 seconds, 10 seconds, or the like, and determine if the object predictions have changed significantly since the lane change was initiated. The vehicle computing system can then determine whether the lane change into the target lane can be completed or if the lane change should be aborted due to the changed circumstances since the lane change was initiated.

If, at 308, the computing system determines that the lane change should be aborted, operations continue to 310.

At 310, upon determining that the lane change should be aborted, the computing system can determine a motion plan (or modify an existing motion plan) that can be executed to abort the initiated lane change. For example, in response to determining that an initiated lane change is no longer feasible and should be aborted, in some implementations, the vehicle computing system can determine a motion plan to abort the lane change based on the current phase of the initiated lane change. If the autonomous vehicle has not begun moving to the target lane (e.g., the autonomous vehicle is in an initiation phase, etc.), the autonomous vehicle can abort the initiated lane change by determining a motion plan that provides for the autonomous vehicle remaining in the current (e.g., original) lane. If the autonomous vehicle has already begun crossing into the target lane (e.g., the autonomous vehicle is in a movement phase, etc.), the autonomous vehicle can abort the lane change by determining a motion plan that provides for the autonomous vehicle to completely return to the original lane (e.g., return to within the boundaries of the original lane).

At 312, the computing system can provide the motion plan to abort the lane change, for example, by providing a motion plan executing one or more control signals to one or more vehicle controls to abort the lane change into the adjacent lane (e.g., by remaining in the current/original lane or returning completely to the original lane).

If, at 308, the computing system determines that the lane change should not be aborted, operations continue to 314. At 314, the computing system can continue with and complete the initiated lane change into the target lane.

Figure 4:
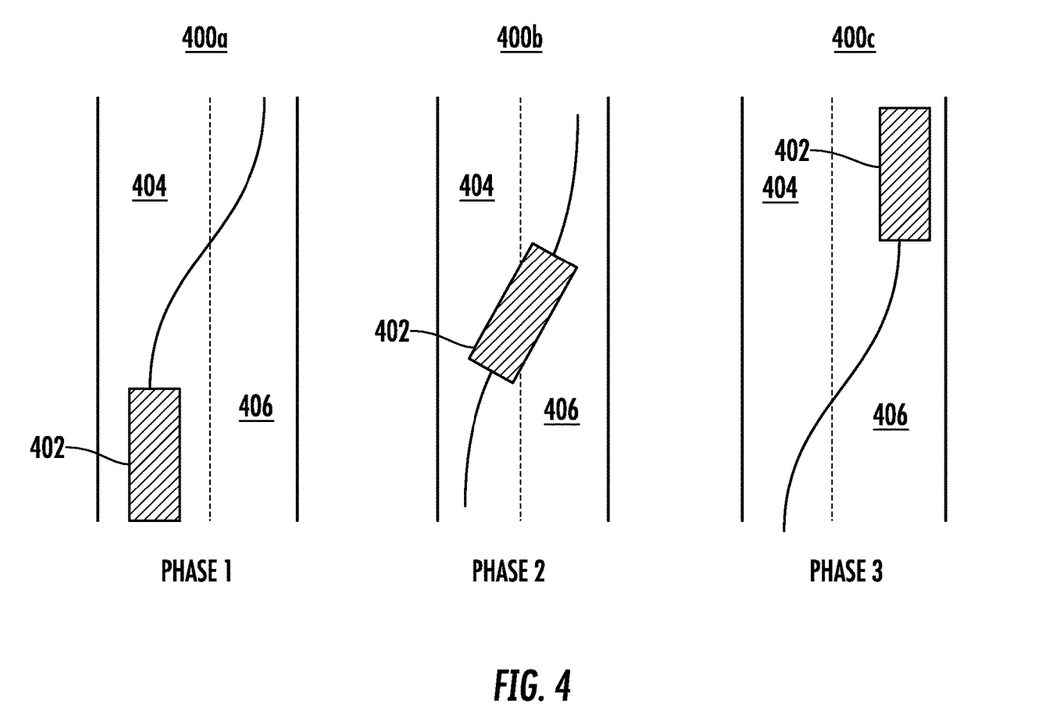
FIG. 4 depicts a block diagram of example phases for a lane change according to example embodiments of the present disclosure.

FIG. 4 depicts a block diagram of example phases 400a-400c for a lane change procedure according to example embodiments of the present disclosure. In some implementations, the performance of a lane change procedure for an autonomous vehicle from an original lane 404 to a target lane 406 may occur in a number of phases and the autonomous vehicle may provide for aborting a lane change differently based on the current phase of the lane change. For example, in some implementations, as illustrated in FIG. 4, the performance of an autonomous vehicle lane change may be divided into three phases. The first phase 400a of a lane change may correspond to an initiation phase that begins once the autonomous vehicle 402 determines that a safe lane change can be executed and the autonomous vehicle 402 may signal the intention to change lanes from original lane 404 to target lane 406. During the first phase 400a, the autonomous vehicle 402 may remain positioned within the current/original lane 404, for example while signaling the intention to change lanes. In some implementations, if the vehicle computing system determines that the lane change should be aborted during the first phase 400a, the autonomous vehicle 402 can abort the lane change by remaining within the boundaries of the current/original lane 404.

During the second phase 400b of the lane change corresponding to a movement phase, the autonomous vehicle 402 moves out of the original lane 404 and at least partially crosses the lane boundary beginning to move into the adjacent/target lane 406. In some implementations, if the vehicle computing system determines that the lane change should be aborted during the second phase 400b, the autonomous vehicle 402 can abort the lane change by completely returning to the original lane 404.

During the third phase 400c of the lane change, the autonomous vehicle 402 completes the move from original lane 404 into the target lane 406 and proceeds within the boundaries of the target lane 406. In some implementations, once the autonomous vehicle 402 is completely in the target lane 406 at the third phase 400c, a change to return back to the original lane 404 can be treated as a new lane change and proceed accordingly. During the three phases of the lane change, the autonomous vehicle 402 may continuously monitor the environment around the autonomous vehicle to ensure that the lane change is executed safely and may make changes to the execution of the lane change accordingly.

Figure 5:
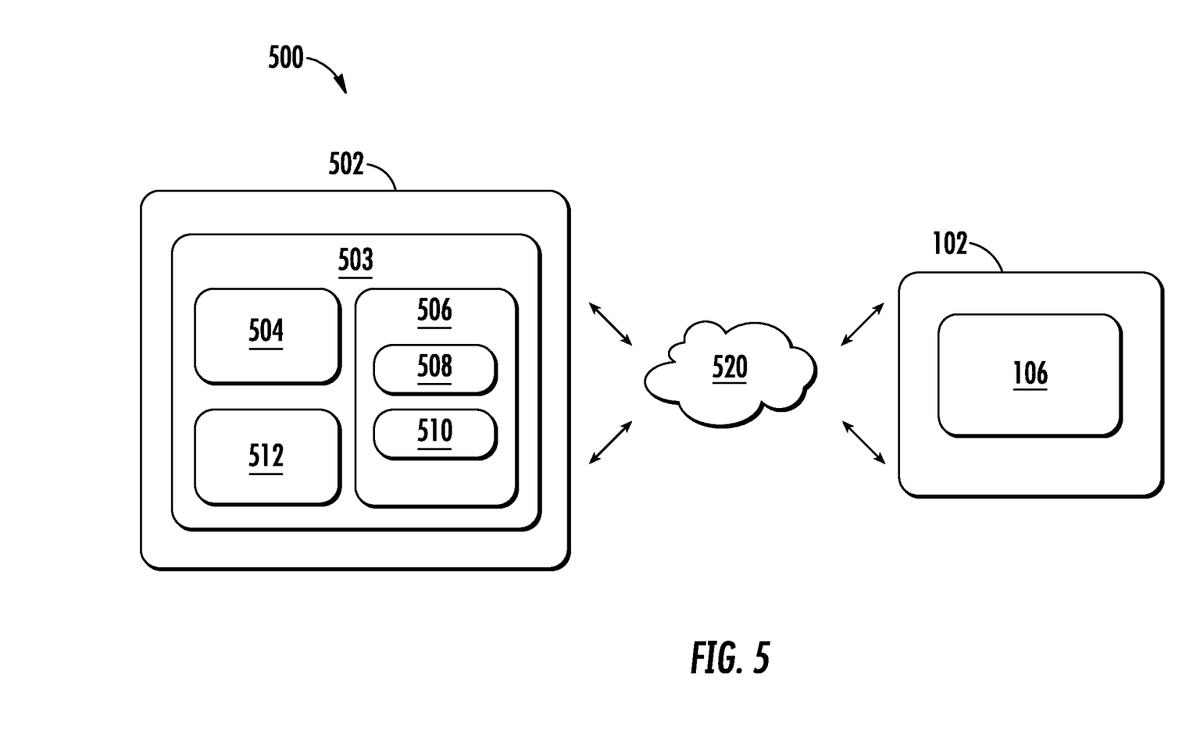
FIG. 5 depicts a block diagram of an example computing system according to example embodiments of the present disclosure.

FIG. 5 depicts a block diagram of an example computing system 500 according to example embodiments of the present disclosure. The example computing system 500 illustrated in FIG. 5 is provided as an example only. The components, systems, connections, and/or other aspects illustrated in FIG. 5 are optional and are provided as examples of what is possible, but not required, to implement the present disclosure. In some implementations, the example computing system 500 can include the vehicle computing system 106 of the autonomous vehicle 102 and a computing system 502 (e.g., an operations computing system), including one or more computing device(s) 503, that is remote from the autonomous vehicle 102. The vehicle computing system 106 of the autonomous vehicle 102 and the computing system 502 can be communicatively coupled to one another over one or more networks 520. The computing system 502 can, for example, be associated with a central operations system and/or an entity associated with the autonomous vehicle 102 such as, for example, a vehicle owner, vehicle manager, fleet operator, service provider, etc.

The computing device(s) 503 of the computing system 502 can include processor(s) 504 and a least one memory 506. The one or more processors 504 can be any suitable processing device (e.g., a processor core, a microprocessor, an ASIC, a FPGA, a controller, a microcontroller, etc.) and can be one processor or a plurality of processors that are operatively connected. The memory 506 can include one or more non-transitory computer-readable storage media, such as RAM, ROM, EEPROM, EPROM, one or more memory devices, flash memory devices, etc., and combinations thereof.

The memory 506 can store information that can be accessed by the one or more processors 504. For instance, the memory 506 (e.g., one or more non-transitory computer-readable storage mediums, memory devices) can include computer-readable instructions 508 can be executed by the one or more processors 504. The instructions 508 can be software written in any suitable programming language or can be implemented in hardware. Additionally, or alternatively, the instructions 508 can be executed in logically and/or virtually separate threads on processor(s) 504.

For example, the memory 506 can store instructions 508 that when executed by the one or more processors 504 cause the one or more processors 504 to perform operations such as any of the operations and functions of the computing device(s) 503 or for which the computing device(s) 503 are configured, as described herein including, for example, operations of FIG. 3.

The memory 506 can store data 510 that can be obtained, received, accessed, written, manipulated, created, and/or stored. The data 510 can include, for instance, sensor data, map data, service request data (e.g., trip and/or user data), operational data, etc., as described herein. In some implementations, the computing device(s) 503 can obtain data from one or more memory device(s) that are remote from the computing system 502.

The computing device(s) 503 can also include one or more communication interfaces 512 used to communicate with one or more other system(s) associated with the computing system 502 and/or another computing device that is remote from the computing system 502, such as the vehicle computing system 106 of the autonomous vehicle 102, for example. The communication interface 512 can include any circuits, components, software, etc. for communicating with one or more networks (e.g., 520). In some implementations, the communication interface 512 can include for example, one or more of a communications controller, receiver, transceiver, transmitter, port, conductors, software, and/or hardware for communicating data.

The network(s) 520 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 520 can be accomplished, for instance, via a communication interface using any type of protocol, protection scheme, encoding, format, packaging, etc.

The vehicle computing system 106 of the autonomous vehicle can include one or more computing devices, such as described in regard to FIG. 1. The computing devices can include components (e.g., processor(s), memory, instructions, data, etc.) similar to that described herein for the computing device(s) 503, and as described in regard to FIG. 1. Moreover, the vehicle computing system 106 can be configured to perform one or more operations, as described herein including, for example, operations of FIG. 3.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for determining whether to abort a lane change in an autonomous vehicle comprising:
    initiating, by a computing system comprising one or more computing devices, a lane change procedure for an autonomous vehicle;
    obtaining, by the computing system, data indicative of one or more changed objects relative to the autonomous vehicle;
    determining, by the computing system, that the lane change procedure cannot be completed by the autonomous vehicle based at least in part on the data indicative of one or more changed objects; and
    in response to determining that the lane change cannot be completed by the autonomous vehicle, generating, by the computing system, a motion plan that controls the autonomous vehicle to abort the lane change procedure;
    wherein the generating, by the computing system, a motion plan that controls the autonomous vehicle to abort the lane change procedure comprises remaining in a current lane if the lane change procedure is in a first phase where the autonomous vehicle has not crossed lane boundaries of the current lane.

2. The computer-implemented method of claim 1, wherein the generating, by the computing system, a motion plan that controls the autonomous vehicle to abort the lane change procedure comprises returning to an original lane if the lane change procedure is in a second phase where the autonomous vehicle has partially crossed a lane boundary of the original lane.

3. The computer-implemented method of claim 1, wherein the determining, by the computing system, that the lane change procedure cannot be completed by the autonomous vehicle comprises determining, by the computing system, whether one or more thresholds have been satisfied.

4. The computer-implemented method of claim 3, wherein the one or more thresholds comprise one or more of:
    a distance to a leading vehicle in a target lane of the lane change procedure;
    a distance to a trailing vehicle in the target lane of the lane change procedure;
    a deceleration threshold for the autonomous vehicle; and
    an acceleration threshold for the autonomous vehicle.

5. The computer-implemented method of claim 1, further comprising:
  determining, by the computing system, that aborting the lane change procedure is not feasible, based at least in part on one or more objects surrounding the autonomous vehicle; and
  in response to determining that aborting the lane change procedure is not feasible, generating, by the computing system, a motion plan that controls the autonomous vehicle to complete the lane change procedure.

6. The computer-implemented method of claim 1, further comprising:
  providing, by the computing system, one or more notifications to a vehicle occupant in response to determining that the lane change cannot be completed by the autonomous vehicle.

7. A computing system comprising:
  one or more processors; and
  one or more memories including instructions that, when executed by the one or more processors, cause the one or more processors to perform operations, the operations comprising:
    initiating a lane change procedure for an autonomous vehicle in keeping with one or more thresholds being satisfied;
    obtaining data indicative of one or more changed objects relative to the autonomous vehicle;
    determining that the lane change procedure cannot be completed by the autonomous vehicle based at least in part on the data indicative of one or more changed objects and that the one or more thresholds cannot still be satisfied; and
    in response to determining that the lane change cannot be completed by the autonomous vehicle, generating a motion plan that controls the autonomous vehicle to abort the lane change procedure;
    wherein the generating a motion plan that controls the autonomous vehicle to abort the lane change procedure comprises returning to an original lane if the lane change procedure is in a second phase where the autonomous vehicle has partially crossed a lane boundary of the original lane.

8. The computing system of claim 7, wherein the generating a motion plan that controls the autonomous vehicle to abort the lane change procedure comprises remaining in a current lane if the lane change procedure is in a first phase where the autonomous vehicle has not crossed lane boundaries of the current lane.

9. The computing system of claim 7, wherein the one or more thresholds comprise one or more of a deceleration threshold of the autonomous vehicle relative to another vehicle or an acceleration threshold of the autonomous vehicle relative to another vehicle.

10. The computing system of claim 7, wherein the one or more thresholds comprise one or more of:
  a distance to a leading vehicle in a target lane of the lane change procedure; or
  a distance to a trailing vehicle in the target lane of the lane change procedure.

11. The computing system of claim 7, the operations further comprising:
  determining that aborting the lane change procedure is not feasible, based at least in part on one or more objects surrounding the autonomous vehicle; and
  in response to determining that aborting the lane change procedure is not feasible, generating a motion plan that controls the autonomous vehicle to complete the lane change procedure.

12. The computing system of claim 7, the operations further comprising:
  providing one or more notifications to a vehicle occupant in response to determining that the lane change cannot be completed by the autonomous vehicle.

13. An autonomous vehicle, comprising:
  a vehicle computing system comprising:
    one or more processors; and
    one or more memories including instructions that, when executed by the one or more processors, cause the one or more processors to perform operations, the operations comprising:
      initiating a lane change procedure for the autonomous vehicle;
      obtaining data indicative of one or more changed objects relative to the autonomous vehicle;
      determining that the lane change procedure cannot be completed by the autonomous vehicle based at least in part on the data indicative of one or more changed objects; and
      in response to determining that the lane change cannot be completed by the autonomous vehicle, generating a motion plan that controls the autonomous vehicle to abort the lane change procedure;
      wherein the generating a motion plan that controls the autonomous vehicle to abort the lane change procedure comprises remaining in a current lane if the lane change procedure is in a first phase where the autonomous vehicle has not crossed lane boundaries of the current lane.

14. The autonomous vehicle of claim 13, wherein the generating a motion plan that controls the autonomous vehicle to abort the lane change procedure comprises returning to an original lane if the lane change procedure is in a second phase where the autonomous vehicle has partially crossed a lane boundary of the original lane.

15. The autonomous vehicle of claim 13, wherein the determining that the lane change procedure cannot be completed by the autonomous vehicle comprises determining whether one or more thresholds have been satisfied.

16. The autonomous vehicle of claim 13, wherein the one or more thresholds comprise one or more of:
  a distance to a leading vehicle in a target lane of the lane change procedure;
  a distance to a trailing vehicle in the target lane of the lane change procedure;
  a deceleration threshold; and
  an acceleration threshold.

17. The autonomous vehicle of claim 13, the operations further comprising:
  determining that aborting the lane change procedure is not feasible, based at least in part on one or more objects surrounding the autonomous vehicle; and
  in response to determining that aborting the lane change procedure is not feasible, generating a motion plan that controls the autonomous vehicle to complete the lane change procedure.

18. A computer-implemented method for determining whether to abort a lane change in an autonomous vehicle comprising:
  initiating, by a computing system comprising one or more computing devices, a lane change procedure for an autonomous vehicle;

obtaining, by the computing system, data indicative of one or more changed objects relative to the autonomous vehicle;

determining, by the computing system, that the lane change procedure cannot be completed by the autonomous vehicle based at least in part on the data indicative of one or more changed objects; and in response to determining that the lane change procedure cannot be completed by the autonomous vehicle, generating, by the computing system, a motion plan that controls the autonomous vehicle to abort the lane change procedure;

wherein the generating, by the computing system, a motion plan that controls the autonomous vehicle to abort the lane change procedure comprises returning to an original lane if the lane change procedure is in a second phase where the autonomous vehicle has partially crossed a lane boundary of the original lane.

19. A computing system comprising:

one or more processors; and one or more memories including instructions that, when executed by the one or more processors, cause the one or more processors to perform operations, the operations comprising:

initiating a lane change procedure for an autonomous vehicle in keeping with one or more thresholds being satisfied;

obtaining data indicative of one or more changed objects relative to the autonomous vehicle;

determining that the lane change procedure cannot be completed by the autonomous vehicle based at least in part on the data indicative of one or more changed objects and that the one or more thresholds cannot still be satisfied; and in response to determining that the lane change cannot be completed by the autonomous vehicle, generating a motion plan that controls the autonomous vehicle to abort the lane change procedure;

wherein the generating a motion plan that controls the autonomous vehicle to abort the lane change procedure comprises remaining in a current lane if the lane change procedure is in a first phase where the autonomous vehicle has not crossed lane boundaries of the current lane.

20. An autonomous vehicle, comprising:

a vehicle computing system comprising:

one or more processors; and one or more memories including instructions that, when executed by the one or more processors, cause the one or more processors to perform operations, the operations comprising:

initiating a lane change procedure for the autonomous vehicle;

obtaining data indicative of one or more changed objects relative to the autonomous vehicle;

determining that the lane change procedure cannot be completed by the autonomous vehicle based at least in part on the data indicative of one or more changed objects; and in response to determining that the lane change cannot be completed by the autonomous vehicle, generating a motion plan that controls the autonomous vehicle to abort the lane change procedure;

wherein the generating a motion plan that controls the autonomous vehicle to abort the lane change procedure comprises returning to an original lane if the lane change procedure is in a second phase where the autonomous vehicle has partially crossed a lane boundary of the original lane.

\* \* \* \* \*